(12) United States Patent
Hagashihara (10) Patent No.: US 7,132,048 B2
(45) Date of Patent: Nov. 7, 2006

(54) FILTER ELEMENT-REMOVING JIG

(75) Inventor: Yukio Hagashihara, Chiba (JP)

(73) Assignee: Entegris, Inc., Chaska, MN (US)

( * ) Notice: Subject to any disclaimer, the term of this patent is extended or adjusted under 35 U.S.C. 154(b) by 0 days.

(21) Appl. No.: 10/533,971

(22) PCT Filed: Apr. 27, 2004

(86) PCT No.: PCT/JP2004/006044

§ 371 (c)(1),
(2), (4) Date: May 5, 2005

(87) PCT Pub. No.: WO2004/096412

PCT Pub. Date: Nov. 11, 2004

(65) Prior Publication Data

US 2006/0011534 A1   Jan. 19, 2006

(30) Foreign Application Priority Data

Apr. 28, 2003   (JP) ............................. 2003-123908

(51) Int. Cl.
*B01D 35/00*   (2006.01)

(52) U.S. Cl. ....................... 210/232; 210/238; 210/541; 210/248; 294/26; 294/90; 294/158; 81/487; 81/489

(58) Field of Classification Search ................ 210/232, 210/238, 541, 542, 248; 294/26, 90, 158; 81/487, 489
See application file for complete search history.

(56) References Cited

U.S. PATENT DOCUMENTS

| | | | | |
|---|---|---|---|---|
| 2,749,172 A * | 6/1956 | Jacobs | ......................... | 294/26 |
| 4,020,922 A * | 5/1977 | Klasel | ......................... | 184/1.5 |
| 4,788,893 A * | 12/1988 | Sutton | ......................... | 81/15.9 |
| 5,405,177 A * | 4/1995 | Goldstein | .................. | 294/19.1 |
| 5,487,576 A * | 1/1996 | DuVivier | .................. | 294/19.1 |

* cited by examiner

*Primary Examiner*—Thomas M. Lithgow
(74) *Attorney, Agent, or Firm*—Timothy J. King; John E. Pillion

(57) ABSTRACT

The object is to provide a filter element extracting jig which facilitates the extracting operation of a filter element from a housing of a filter device and prevents its contamination.

A filter element extracting jig is formed from an elastic plate and comprising a supporting portion, a spring portion extending at an acute angle with the supporting portion, a hook portion extending toward the supporting portion, and an operating portion extending from the hook portion at substantially right angles, which are constructed by bending at bent portions substantially parallel to each other in that order.

28 Claims, 7 Drawing Sheets

FILTER ELEMENT-REMOVING JIG

TECHNICAL FIELD

The present invention relates to an extracting jig of filer element and, more particularly, to a jig which extracts a filter element from a housing in the case of a replaceable filter element.

BACKGROUND ART

A filter cartridge is typically constituted by a gastight housing that accommodates a cylindrical filter element having an inner passage and a gastight head that is integrally connected to the housing. In the case of a disposable type, the housing and the head are integrally connected to each other to form one filter cartridge as a whole. In the case of a replaceable type, the head is detachably connected to the housing by fastening means having seal means and the filter element is replaced before a filtration life limit.

Figure 2:
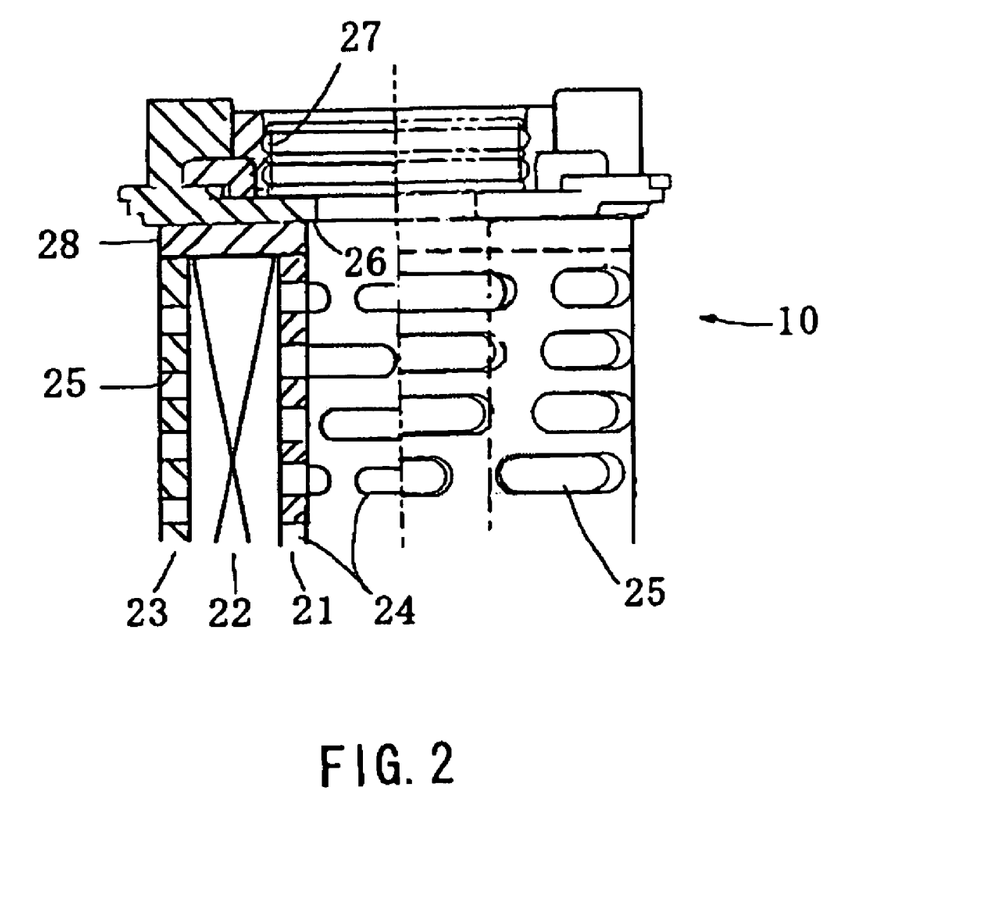
FIG. 2 is a partial sectional view of the upper portion of a filter element.

Although usually there are a convoluted type filter element and a pleated type filter element, the latter filter element has become mainstream because of its large filtration area. As shown in FIG. 2, a pleated type filter element 10 is constituted by a filter medium 22, which is fabricated by folding in pleats a superimposed body that is obtained by attaching a pair of porous supporting sheets to both surfaces of a thermoplastic filtration film and by sealing both sides edges together, an inner cylinder 21 having a large number of apertures 24 and an outer cylinder 23 having a large number of apertures 25, which support the filter medium from both surfaces, and top and bottom covers, which are fusion bonded to the top and bottom ends of the filter medium 22 to hermetically seal the filter medium, (only the top cover 28 is shown in FIG. 2).

Figure 5:
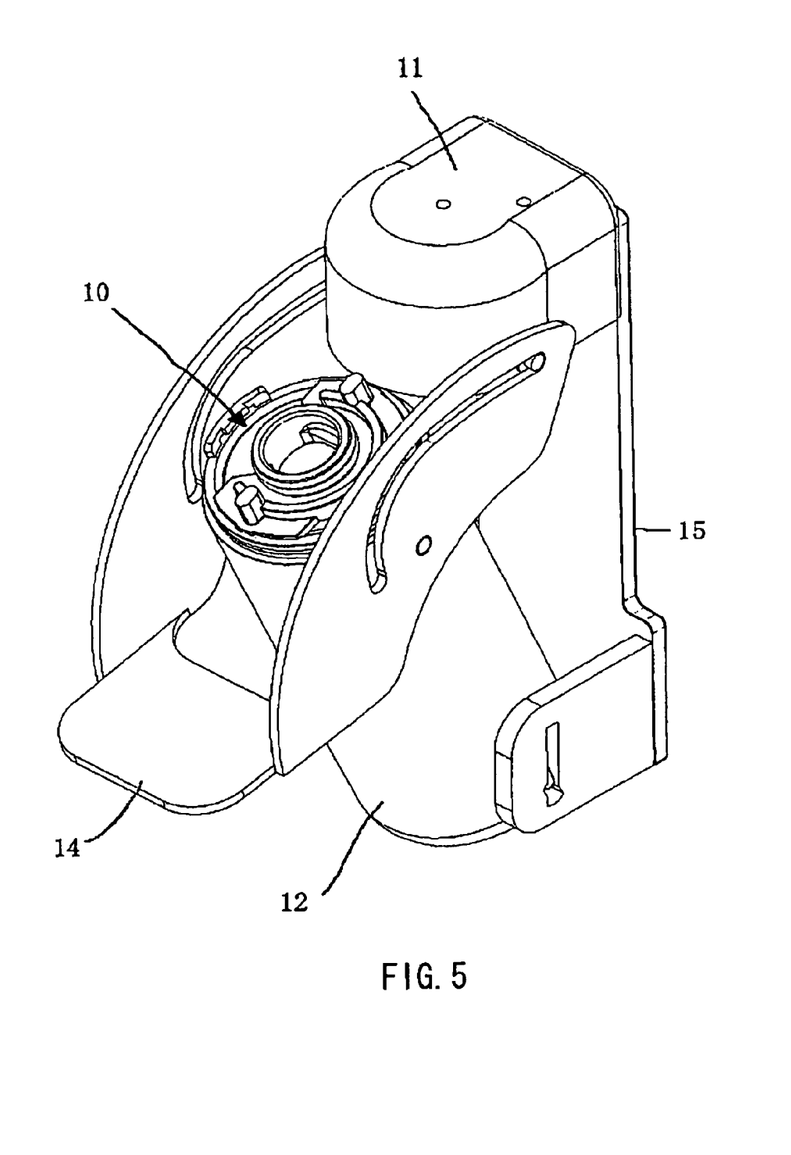
FIG. 5 is a perspective view that shows the condition where a housing is tilted in the filter element extraction position, in an example of a filter device having a filter element, a housing and a head.
Figure 6:
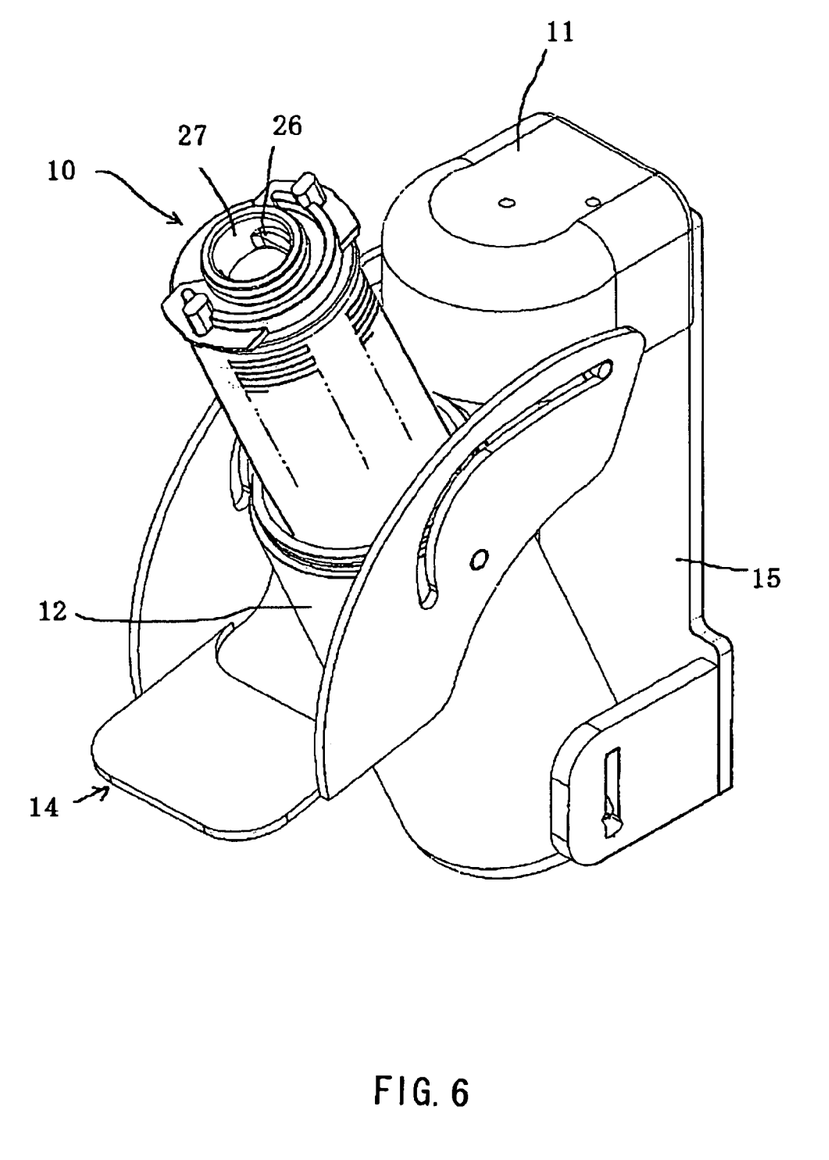
FIG. 6 is a perspective view that is like FIG. 5 and shows the condition where the filter element is being extracted.

As shown in FIGS. 5 and 6, in a filter device comprising a housing 12 which is pivoted to a supporting frame 15 and a head 11 which is fixed to the supporting frame 15, an inlet for a liquid to be treated is usually provided in the lower part or head of the housing (in this example, in the head) and an outlet for a filtered liquid is usually provided in the lower part or head of the housing (in this example, in the head). Furthermore, in some cases, a gas vent port to vent gas bubbles generated from gases dissolved in a liquid to be treated or a filtered liquid may sometimes be provided in the head (in this example, this gas vent port is not used).

In FIG. 2, FIGS. 5 and 6, a liquid to be treated is introduced from an inlet for a liquid to be treated which is provided at the head 11 to between a filter element 10 and the housing 12, and the liquid to be treated permeates a filter medium 22 from the multi-aperture outer cylinder 23. Particles or solid contamination are trapped to the outer surface of the filter medium 22, and the filtered liquid which has permeated the filter medium 22 flows from an inner passage of a multi-aperture inner cylinder 21 via an outlet leading for a filtered liquid 27 to a filtered liquid discharge outlet which is provided at the head 11. Incidentally, a stepped portion 26 which serves as a finger engaging portion during the extraction is formed in the outlet leading 27.

Filters each using a cartridge are classified into a type in which a cartridge to be used is integral with a housing portion and a type in which a cartridge is replaceable. The present invention provides a jig for replacing a filter element in a replaceable cartridge filter.

DISCLOSURE OF THE INVENTION

Problems to be Solved by the Invention

In replacing a filter element in the replaceable cartridge filter, for example, as shown in FIG. 5, the housing 12 is tilted and the filter element 10 is extracted upward as shown in FIG. 6 by holding a protrusion around the outlet leading for a filtered liquid 27 or a protrusion within the outlet leading, with bare hands or gloved hands. However, because the load of the filter element is often as heavy as 1 kg to several kilograms, this operation is not easy.

Furthermore, because the extracting operation is not easily performed, there is a possibility that not only the filter element portion, but also the housing portion may be touched with fingers and hence there is a possibility that when extra fine filtration is necessary or when drugs are treated, the contamination which occurs due to touching by hands may contaminate a filtered liquid.

The object of the present invention is to provide a filter element extracting jig which enables the extraction of a filter element to be reliably and easily carried out and is free from a fear of contamination.

Means for Solving the Problems

The invention provides a filter element extracting jig, wherein the filter element extracting jig is formed from a plate, and a supporting portion and a hook portion are formed by bending, the hook portion extending substantially in the shape of V with respect to said supporting portion. The extracting jig of this construction is suitable for disposal. If the extracting jig is made of plastics or the like at low cost, it can be simply discarded together with the contaminated filter element, since the filter element contaminated with solid matter can be discarded without being reused.

Also, the invention solves the problems by providing a filter element extracting jig, wherein the filter element extracting jig is formed from an elastic plate, and a supporting portion, a spring portion extending at an acute angle with the supporting portion, a hook portion extending toward the supporting portion, and an operating portion extending at substantially right angles from the hook portion, are formed by connecting those in that order at bent portions.

More specifically, the jig according to the invention comprises a supporting portion, a spring portion extending from a leading end of the supporting portion via a first bent portion at an acute angle with respect to the supporting portion, a hook portion extending from the other end of the spring portion via a second bent portion toward the supporting portion, and an operating portion extending from the other end of the hook portion via a third bent portion at substantially right angles with respect to the hook portion. The directions of the bent lines of the bent portions are substantially parallel to each other.

In a preferred embodiment, a handle portion is formed at a top end of the supporting portion, and a finger engaging opening is provided at the handle portion.

The jig according to the invention is formed from an elastic single rigid plastic or a single metal plate on a case-by-case basis.

Furthermore, the invention provides a combination of the jig according to the invention and a plastic bag accommodating the jig in such a manner that it is opened on a side of a top end of the supporting portion.

Operation

When extracting the filter element, the spring portion formed at the leading end of the supporting portion is pressed into the outlet leading for the filtered liquid of the filter element accommodated in the housing, while holding the supporting potion of the extracting jig of the invention by hands. When the spring portion enters the outlet leading for the filtered liquid, the hook portion is depressed and narrowed during passing through a contour of the outlet leading and a stepped portion, then the hook portion engages with the stepped portion of the outlet leading, and the spring potion widens a little and comes into a condition in which the spring portion captures the filter element. Next, when the supporting portion is drawn upward, the filter element can be drawn out of the housing. Lastly, when the operating portion is pressed by a finger and the spring portion is narrowed, the hook portion is removed from the stepped portion of the outlet leading.

When a liquid to be treated is chemical liquid, in order to prevent the chemical liquid from adhering to fingers, the above operation is performed after covering the extracting jig by a plastic bag such as a polyethylene bag. The extracting jig of the invention is also useful in that it is possible to cover the used filter element by the plastic bag without touching a liquid to be treated or the filtered liquid, by separating the plastic bag from a periphery of the extracting jig and covering a periphery of the filter element with it, before the removal of the extracting jig. Since the timing of extraction is also the timing of replacement with a new cartridge, if the bag accommodating the new cartridge for replacement is used as it is for the above purpose, the waste is not incurred at all.

BRIEF DESCRIPTION OF THE DRAWINGS

FIG. 1(*a*) to 1(*b*) shows a filter element extracting jig according to the invention, (a) thereof being its front view and (b) thereof being its left side view;

FIG. 3(*a*) to 3(*d*) is an order diagram that shows how to use the extracting jig according to the invention;

EMBODIMENTS OF INVENTION

Figure 1:
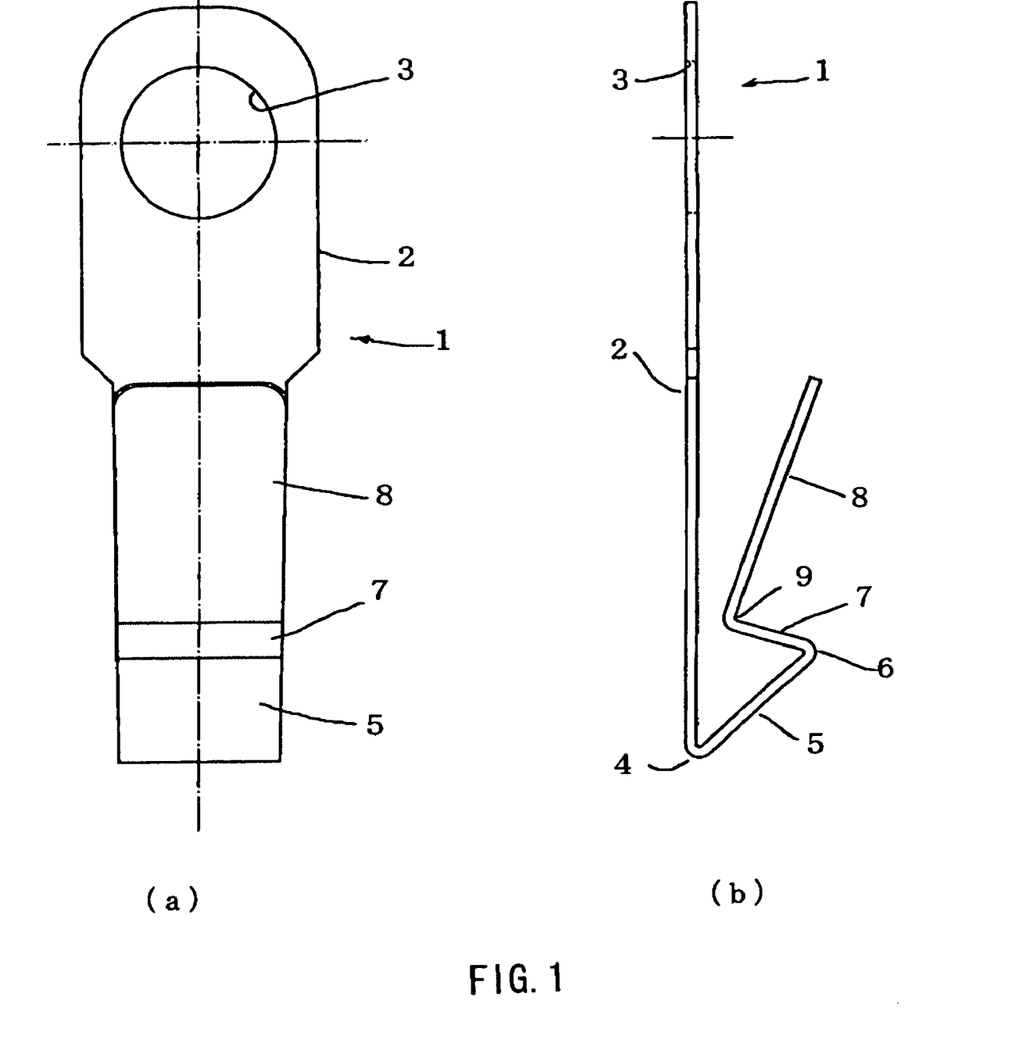

FIG. 1 shows the details of a filter element extracting jig according to an embodiment of the invention, (a) of FIG. 1 being its front view and (b) of FIG. 1 being its left side view.

The filter element extracting jig 1 is formed from one sheet of corrosion resistant plastic plate of high rigidity and of polyethylene, polycarbonate and the like, or a corrosion resistant metal plate of stainless steel and the like. The extracting jig 1 has a supporting portion 2. The supporting portion 2 is determined so as to have an overall length necessary for extraction operation. A spring portion 5 which extends from a leading end of the supporting portion 2 (in the figure, the bottom end) via a first bent portion 4 at an acute angle with the supporting portion 2 is formed. The angle of the spring portion 5 with the supporting portion 2 and the elasticity thereof are determined to such an extent that if there is an obstacle during the insertion of the jig 1 into the outlet leading for a filtered liquid of the filter element, the spring portion 5 can easily follow the obstacle. At the other end of the spring portion 5, there is provided a hook portion 7 which extends toward the supporting portion 2 via a second bent portion 6 substantially parallel to the side forming the first bent portion 4. This hook portion 7 is determined such that it can engage with the lower side of a protrusion formed on the inner wall surface of the outlet leading for a filtered liquid of the filter element. At the other end of the hook portion 7, there is provided an operating portion 8 which extends substantially at right angles with the hook portion 7 via a third bent portion 9 being similarly substantially parallel. The length of the operating portion 8 is determined at a distance such that the operating portion protrudes sufficiently above the upper part of the filer element in a condition where the hook portion 7 is engaged with the filter element, while the second bent portion 6 can retract sufficiently from the engaged part with the filter element when the top end of the operating portion is pressed by a hand.

The top end of the supporting portion 2 can be formed as a wide handle portion and can be provided with a finger hook opening 3 so as to be easily held by a hand (to be easily drawn by inserting a finger into the opening).

Figure 7:
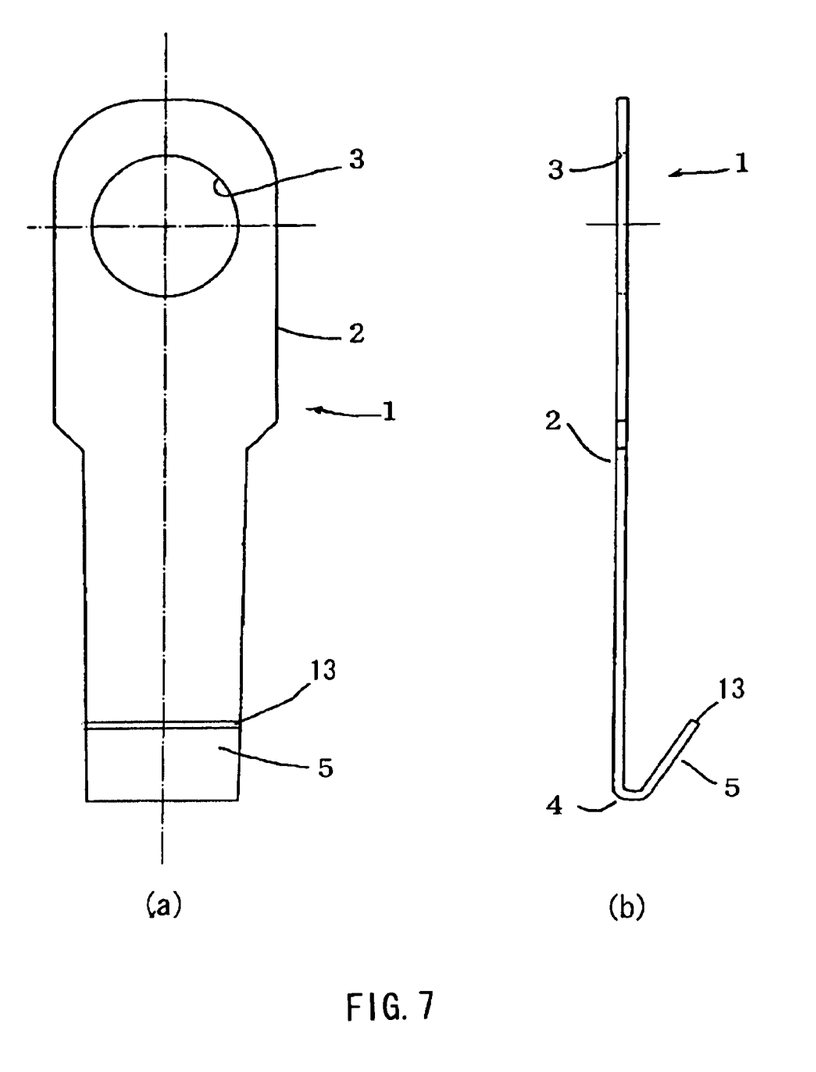
FIG. 7 shows another embodiment of a filter element extracting jig according to the invention, (a) thereof being its front view and (b) thereof being its left side view.

FIG. 7 shows a disposable extracting jig according to another embodiment. The common portions to this figure and FIG. 1 are denoted by the same reference numerals and the explanations therefor are omitted. In this embodiment, the bent portion 4 has a relatively large radius of curvature, the leading end of the spring portion 5 terminates in a simple edge 13, the plate-like supporting portion 2 and the plate-like spring portion 5 form a substantially V-shape, and the edge 13 forms an engaging portion with the filter element. The extracting jig of this embodiment is a disposable type such that the filter element cannot be extracted if once the edge 13 is engaged to an inner hole of the filter element.

How to use the filter element extracting jig according to the present invention will be described below.

First, it is assumed that as shown in FIG. 5, the housing 12 which accommodates the filter element 10 is positioned in an extracting position by operating a lever 14. The filter element 10 in the same condition is shown in (a) of FIG. 3. A plastic bag B is covered on the extracting jig while the extracting jig 1 is held by a hand. As shown in (a) of FIG. 3, the end portion of the extracting jig 1 is inserted in a direction indicated by an arrow, into an outlet leading for a filtered liquid 27 of the filter element. At this time, as shown in (b) of FIG. 3, the bent portion 6 located at the top end of the spring portion of the extracting jig 1 is pressed by stepped portions 26 of the outlet leading 27, thereby to be buckled. (Two stepped portions 26 are provided in an opposed manner. Refer to FIG. 4). When it is further pressed in the direction of the arrow, the bent portion 6 goes beyond the stepped portion 26 and therefore, as shown in (c) of FIG. 3, the spring restores in the direction of the arrow. When the extracting jig is drawn up from such condition, the filter element 10 is extracted from the housing 12.

Figure 3:
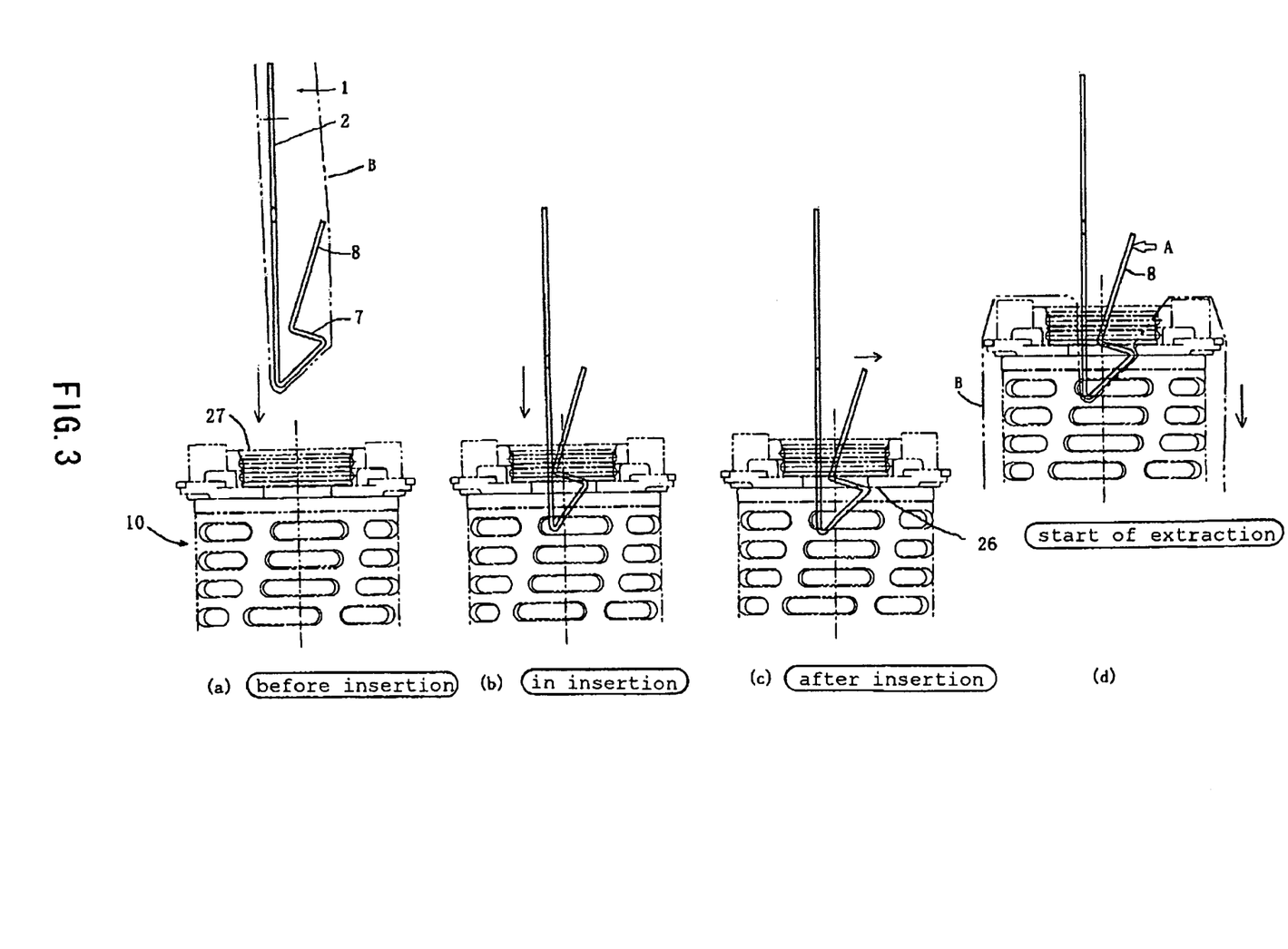
Figure 4:
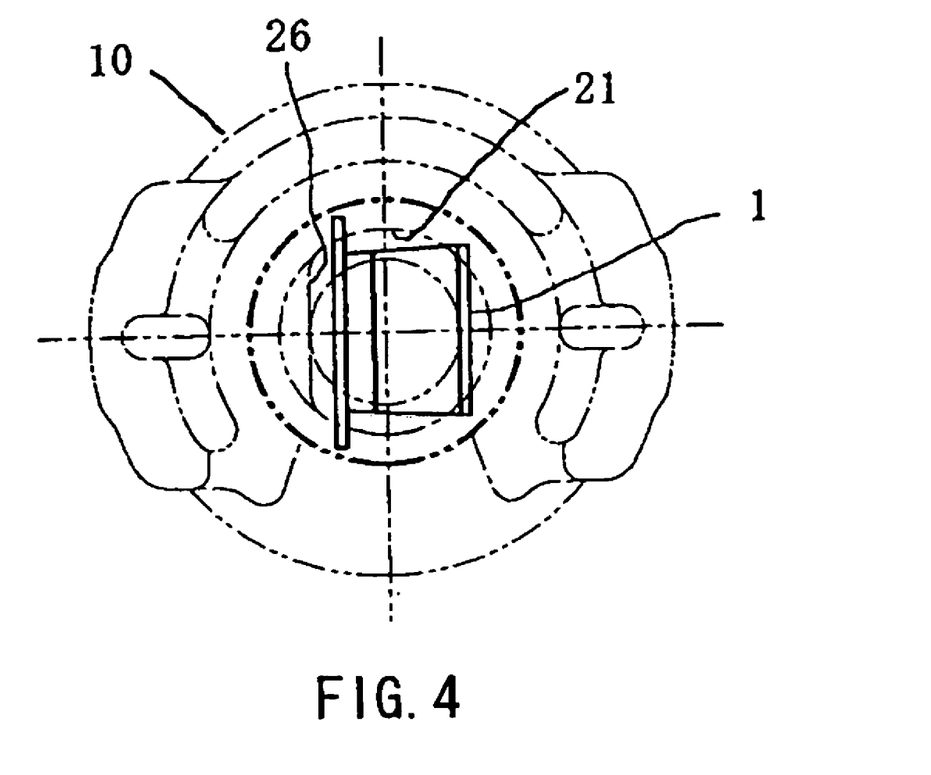
FIG. 4 is a diagram that shows the relationship between the extracting jig of the invention and the top end portion of the filter element when using.

While keeping the extracting jig being held by a hand, the plastic bag B is reversed and directly put over the filter element, as shown in (d) of FIG. 3. Then, the operating portion of the jig 1 is pressed in a direction of A, and the filter element is drawn in a direction of an arrow (by its weight or the like) or the extracting jig is drawn upward.

This ensures that the used and soiled filter element is automatically accommodated in the bag without difficulty.

In the disposable jig shown in FIG. 7, when the V-shaped leading end is inserted into the inner hole of the filter element, the spring portion 5 is pressed by a wall of the inner hole and compressed. When the edge 13 goes beyond the stepped portion 26, the spring portion restores and is engaged with the lower side of the stepped portion 26 and becomes in a condition where the spring portion cannot be detached anymore. After the removal of the filer element, the jig can be discarded as it is without being detached from the filter element. That is, in this case, the edge 13 of the spring portion 5 serves as the hook portion 7.

Furthermore, the invention can be embodied by using an inelastic plate. In this case, a jig is fabricated beforehand in the condition shown in FIG. 7 and the jig is rotated by 90 degrees to be engaged with the stepped portion 26, after insertion into the outlet leading 27.

ADVANTAGES OF THE INVENTION

Thus, according to the extracting jig of the present invention, it is possible to extract a filter element from a housing by a simple operation without touching the filter device by hands, and the use of a plastic bag in combination therewith further ensures the advantage that a fear of contamination of the filter device by hands, and conversely a fear of contamination of hands by a liquid to be treated, such as a chemical liquid, are prevented. Furthermore, replacement operation can be comfortably performed without contaminating the place where the device is installed and the like.

It has been found that when the leading end of the extracting jig is inserted into the inner hole of the filter element, an interference under elasticity between the spring portion 5 and the inner hole wall and stepped portion 26 occurs, and the extracting jig is naturally guided in the direction in which the surface of the spring portion 5 and the surface of the stepped portion 26 come into an opposed condition. For this reason, the extracting operation of the filter element becomes easy.

The invention claimed is:

1. A filter element extracting jig, and bag characterized in that the filter element extracting jig is formed from a plate, and a supporting portion and a hook portion are formed by bending, said hook portion extending substantially in the shape of V with respect to said supporting portion, said hook portion has an edge that engages an inner hole of a replaceable filter cartridge element and a plastic bag accommodating said extraction jig in such a manner that the bag is opened on a side of a top end of said supporting portion of the jig.

2. A filter element extracting jig, characterized in that the filter element extracting jig is formed from an elastic plate, and a supporting portion, a spring portion extending at an acute angle with said supporting portion, a hook portion extending toward said supporting portion, and an operating portion extending at substantially right angles from said hook portion, are formed by bending in that order at bent portions.

3. A filter element extracting jig, characterized in that the filter element extracting jig comprises a supporting portion, a spring portion extending from a leading end of said supporting portion via a first bent portion at an acute angle with respect to said supporting portion, a hook portion extending from the other end of said spring portion via a second bent portion toward said supporting portion, and an operating portion extending from the other end of said hook portion via a third bent portion at substantially right angles with respect to said hook portion.

4. The filter element extracting jig according to claim 2 or 3, characterized in that said bent portions are substantially parallel to each other.

5. The filter element extracting jig according to claim 1, characterized in that said supporting portion has a handle portion at a top end thereof, and a finger engaging opening is provided at the handle portion.

6. The filter element extracting jig according to claim 1, characterized in that the jig is formed from a single plastic or metal plate.

7. The filter element extracting jig according to claim 2, characterized in that said supporting portion has a handle portion at a top end thereof, and a finger engaging opening is provided at the handle portion.

8. The filter element extracting jig according to claim 3, characterized in that said supporting portion has a handle portion at a top end thereof, and a finger engaging opening is provided at the handle portion.

9. The filter element extracting jig according to claim 4, characterized in that said supporting portion has a handle portion at a top end thereof, and a finger engaging opening is provided at the handle portion.

10. The filter element extracting jig according to claim 2, characterized in that the jig is formed from a single plastic or metal plate.

11. The filter element extracting jig according to claim 3, characterized in that The jig is formed from a single plastic or metal plate.

12. The filter element extracting jig according to claim 4, characterized in that the jig is formed from a single plastic or metal plate.

13. The filter element extracting jig according to claim 5, characterized in that the jig is formed from a single plastic or metal plate.

14. The filter element extracting jig according to claim 7, characterized in that the jig is formed from a single plastic or metal plate.

15. The filter element extracting jig according to claim 8, characterized in that the jig is formed from a single plastic or metal plate.

16. The filter element extracting jig according to claim 9, characterized in that the jig is formed from a single plastic or metal plate.

17. The combination of the filter element extracting jig according to claim 2 and a plastic bag accommodating said extracting jig in such a manner that it is opened an a side of a top end of said supporting portion.

18. The combination of the filter element extracting jig according to claim 3 and a plastic bag accommodating said extracting jig in such a manner that it is opened on a side of a top end of said supporting portion.

19. The combination of the filter element extracting jig according to claim 4 and a plastic bag accommodating said extracting jig in such a manner that it is opened on a side of a top end of said supporting portion.

20. The combination of the filter element extracting jig according to claim 7 and a plastic bag accommodating said extracting jig in such a manner that it is opened on a side of a top end of said supporting portion.

21. The combination of the filter element extracting jig according to claim 8 and a plastic bag accommodating said extracting jig in such a manner that it is opened on a side of a top end of said supporting portion.

22. The combination of the filter element extracting jig according to claim 9 and a plastic bag accommodating said extracting jig in such a manner that it is opened on a side of a top end of said supporting portion.

23. The combination of the filter element extracting jig according to claim 10 and a plastic bag accommodating said extracting jig in much a manner that it is opened on a side of a top end of said supporting portion.

24. The combination of the filter element extracting jig according to claim 11 and a plastic bag accommodating said extracting jig in such a manner that it is opened on a side of a top end of said supporting portion.

25. The combination of the filter clement extracting jig according to claim 12 and a plastic bag accommodating said extracting jig in such a manner that it is opened on a side of a top end of said supporting portion.

26. The combination of the filter element extracting jig according to claim 14 and a plastic bag accommodating said extracting jig in such a manner that it is opened on a side of a top end of said supporting portion.

27. The combination of the filter element extracting jig according to claim 15 and a plastic bag accommodating said extracting jig in such a manner that it is opened on a side of a top end of said supporting portion.

28. The combination of the filter element extracting jig according to claim 16 and a plastic bag accommodating said extracting jig in such a manner that it is opened on a side of a top end of said supporting portion.

* * * * *